United States Patent
Barry et al.

(10) Patent No.: US 10,832,150 B2
(45) Date of Patent: Nov. 10, 2020

(54) OPTIMIZED RE-TRAINING FOR ANALYTIC MODELS

(71) Applicant: INTERNATIONAL BUSINESS MACHINES CORPORATION, Armonk, NY (US)

(72) Inventors: Paul M. J. Barry, Cork (IE); Cormac Cummins, Cork (IE); Ian Manning, Cork (IE); Vinh Tuan Thai, Cork (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 15/222,544

(22) Filed: Jul. 28, 2016

(65) Prior Publication Data

US 2018/0032903 A1    Feb. 1, 2018

(51) Int. Cl.
*G06N 7/00*       (2006.01)
*G06N 5/04*       (2006.01)

(52) U.S. Cl.
CPC ............. *G06N 7/005* (2013.01); *G06N 5/045* (2013.01)

(58) Field of Classification Search
CPC .......... G06N 7/005; G06N 7/00; G06N 20/00; G06N 5/04
See application file for complete search history.

(56) References Cited

U.S. PATENT DOCUMENTS

| | | |
|---|---|---|
| 6,347,310 B1 | 2/2002 | Passera |
| 7,191,150 B1 | 3/2007 | Shao et al. |
| 7,310,590 B1 | 12/2007 | Bansal |
| 8,554,703 B1 | 10/2013 | Lin et al. |
| 2006/0044133 A1* | 3/2006 | Lou .......................... F24C 7/08 340/531 |
| 2008/0312832 A1* | 12/2008 | Greene .................. G08G 1/166 701/301 |
| 2011/0320228 A1* | 12/2011 | Kowalski ......... G06Q 10/06393 705/7.11 |

(Continued)

OTHER PUBLICATIONS

Tim Marrinan, "Markov Chains: Roots, Theory, and Applications", 2008 (Year: 2008).*

(Continued)

*Primary Examiner* — Alexey Shmatov
*Assistant Examiner* — Sehwan Kim
(74) *Attorney, Agent, or Firm* — Tutunjian & Bitetto, P.C.; Scott Dobson (57) ABSTRACT

A method and system are provided for retraining an analytic model. The method includes building, by a processor, a Markov chain for the analytic model. The Markov chain has only two states that consist of an alarm state and a no alarm state. The method further includes updating, by the processor, the Markov chain with observed states, for each of a plurality of timestamps evaluated during a burn-in period. The method also includes updating, by the processor, state transition probabilities within the Markov chain, for each of a plurality of timestamps evaluated after the burn-in period. The method additionally includes generating, by the processor, a signal for causing the model to be retrained, responsive to any of the state transition probabilities representing a probability of greater than 0.5 of seeing the alarm state in a previous interval and again in a current interval.

18 Claims, 7 Drawing Sheets

(56) References Cited

U.S. PATENT DOCUMENTS

| | | | | |
|---|---|---|---|---|
| 2014/0051379 A1* | 2/2014 | Ganesh | ............... | H04W 76/14 |
| | | | | 455/404.1 |
| 2015/0127595 A1 | 5/2015 | Hawkins, II et al. | | |
| 2015/0178638 A1 | 6/2015 | Depshpande et al. | | |
| 2015/0193699 A1* | 7/2015 | Kil | ...................... | G06Q 10/04 |
| | | | | 706/12 |
| 2015/0355901 A1 | 12/2015 | Bonissone et al. | | |
| 2016/0232446 A1* | 8/2016 | Singh | ..................... | G06N 7/005 |

OTHER PUBLICATIONS

John Cook, "MCMC burn-in", Jan. 25, 2016, https://www.johndcook.com/blog/2016/01/25/mcmc-burn-in/ (Year: 2016).*

Mokarian, A. et al., "False Positives Reduction Techniques in Intrusion Detection Systems—A Review" IJCSNS International Journal of Computer Science and Network Security (Oct. 2013) pp. 128-134, vol. 13, No. 10.

Chan, P. et al., "Modeling Multiple Time Series for Anomaly Detection" Proceedings of the Fifth IEEE International Conference on Data Mining Proceeding ICDM '05 (2005) pp. 90-97.

Rayomndl, "Retrain Machine Learning Models Programmatically", https://azure.microsoft.com/en-us/documentation/articles/machine-learning-retrain-models-programmatically/, May 2016, 6 pp.

Bifet, et al., "Learning from Time-Changing Data with Adaptive Windowing", http://www.cs.upc.edu/%7Eabifet/TimevaryingE.pdf, Oct. 2006, pp. 1-17.

* cited by examiner

OPTIMIZED RE-TRAINING FOR ANALYTIC MODELS

BACKGROUND

Technical Field

The present invention relates generally to information processing and, in particular, to optimized re-training for analytic models.

Description of the Related Art

Analytic models are used in many anomaly detection solutions as a means of modelling system behavior and identifying when it deviates from the norm. These models typically consider a large number of features in order to accurately model the target system.

In the IT Operations domain, this process of training on observed data to produce a model exhibits the following significant characteristics. One such characteristic is that IT data is typically very large. Another characteristics is that building analytic models can be computationally expensive, and this usually poses a problem at scale. Yet another characteristics is model aging/obsolescence, as deploying models that are not good representations of the current behavior of the target system can lead to significant false alarm rates. Therefore, deployed models that are "out of date" need to be retrained.

Expensive model training makes it desirable, if not mandatory in some circumstances, to retrain only when necessary. However it is difficult without actually doing the training to determine when re-training should occur. Thus, a common approach is to pick an arbitrary time period and retrain automatically when the time period has expired. The time period selected will vary based on the likelihood of change in the normal behavior of the data. Dynamic systems often require regular re-training and commonly are retrained every day.

This common approach of retraining at regular intervals has a clear disadvantage: models are being rebuilt either when it is not necessary to do so or when it should happen earlier. In IT Operations, the nature and type of metrics vary, with some rarely needing to be retrained and others requiring very regular retraining. The use of virtualization in modern IT Operational settings increases the variance in the data and hence makes it very difficult to pick a one size fits all retraining interval. If we retrain models at regular intervals, models on slowly varying data are rebuilt continuously unnecessarily and this has an associated cost in terms of computational cycles. On the other hand, some models are not rebuilt often enough (for more volatile data) and so become stale and inaccurate. The only way to tackle this is to reduce the period of model retraining and this has an associated computational cost. These computation costs have a direct hardware requirement which has a direct fiscal cost.

SUMMARY

According to an aspect of the present principles, a method is provided for retraining an analytic model. The method includes building, by a processor, a Markov chain for the analytic model. The Markov chain has only two states that consist of an alarm state and a no alarm state. The method further includes updating, by the processor, the Markov chain with observed states, for each of a plurality of timestamps evaluated during a burn-in period. The method also includes updating, by the processor, state transition probabilities within the Markov chain, for each of a plurality of timestamps evaluated after the burn-in period. The method additionally includes generating, by the processor, a signal for causing the model to be retrained, responsive to any of the state transition probabilities representing a probability of greater than 0.5 of seeing the alarm state in a previous interval and again in a current interval.

According to another aspect of the present principles, a computer program product is provided for retraining an analytic model. The computer program product includes a non-transitory computer readable storage medium having program instructions embodied therewith. The program instructions are executable by a computer to cause the computer to perform a method. The method includes building, by a processor, a Markov chain for the analytic model. The Markov chain has only two states that consist of an alarm state and a no alarm state. The method further includes updating, by the processor, the Markov chain with observed states, for each of a plurality of timestamps evaluated during a burn-in period. The method also includes updating, by the processor, state transition probabilities within the Markov chain, for each of a plurality of timestamps evaluated after the burn-in period. The method additionally includes generating, by the processor, a signal for causing the model to be retrained, responsive to any of the state transition probabilities representing a probability of greater than 0.5 of seeing the alarm state in a previous interval and again in a current interval.

According to still another aspect of the present principles, a system is provided for retraining an analytic model. The system includes a processor and a memory, configured to build a Markov chain for the analytic model. The Markov chain has only two states that consist of an alarm state and a no alarm state. The processor and memory are further configured to update the Markov chain with observed states, for each of a plurality of timestamps evaluated during a burn-in period. The processor and memory are also configured to update state transition probabilities within the Markov chain, for each of a plurality of timestamps evaluated after the burn-in period. The processor and memory are additionally configured to generate a signal for causing the model to be retrained, responsive to any of the state transition probabilities representing a probability of greater than 0.5 of seeing the alarm state in a previous interval and again in a current interval.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present principles are directed to optimized re-training for analytic models.

In an embodiment, the present principles provide an approach for optimally determining when to retrain an analytic model in a monitoring system such as, for example, a performance monitoring system. In an embodiment, the monitoring system can receive data from multiple sources for analysis and raise alarms when anomalies occur. In an embodiment, the present principles can be used, for example, in an anomaly detection system for IT Operations. However, the present principles can be readily applied to other types of systems and other types of operations that involve models that need to be retrained, as readily appreciated by one of ordinary skill in the art given the teachings of the present principles provided herein, while maintaining the spirit of the present principles.

Figure 1:
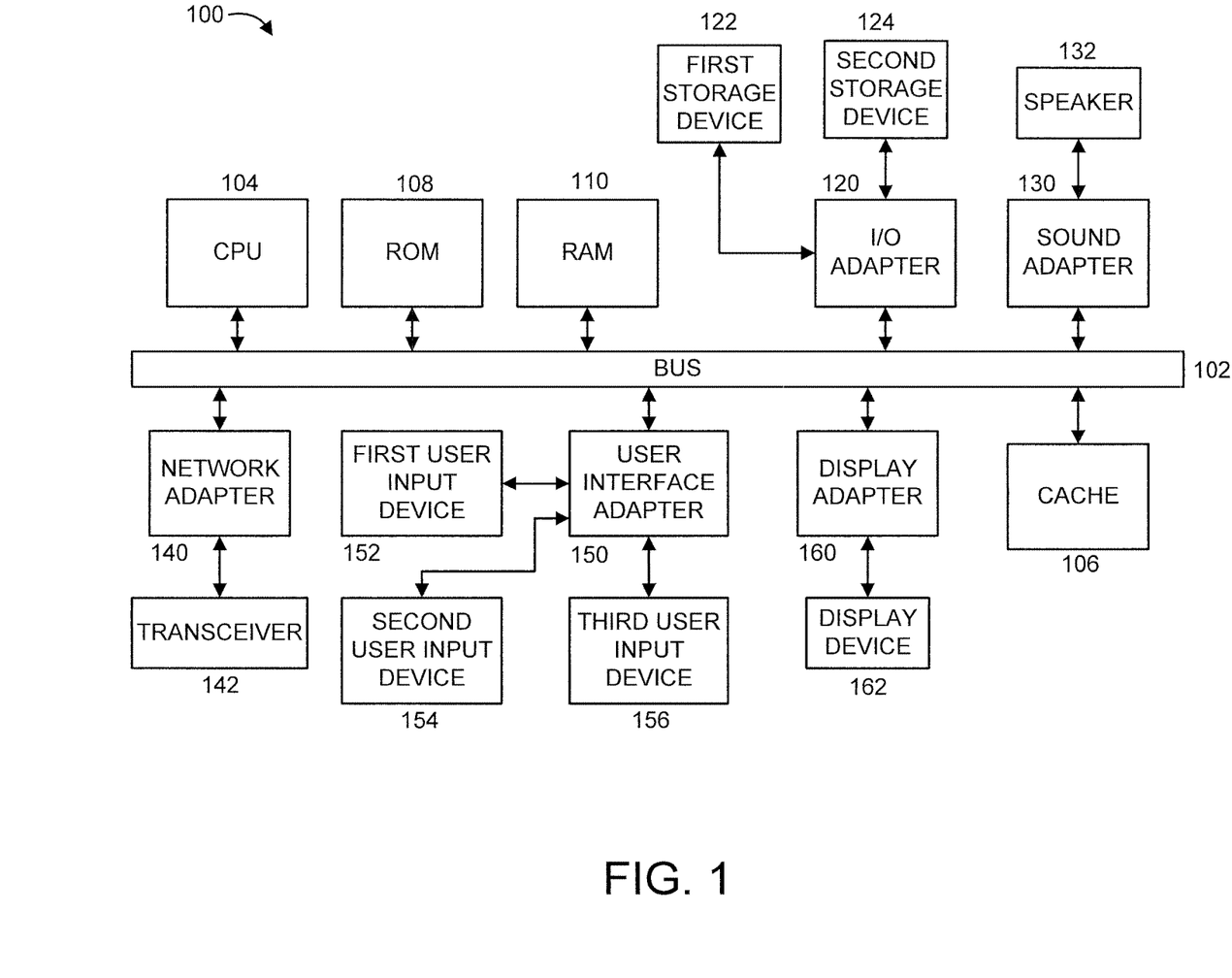
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
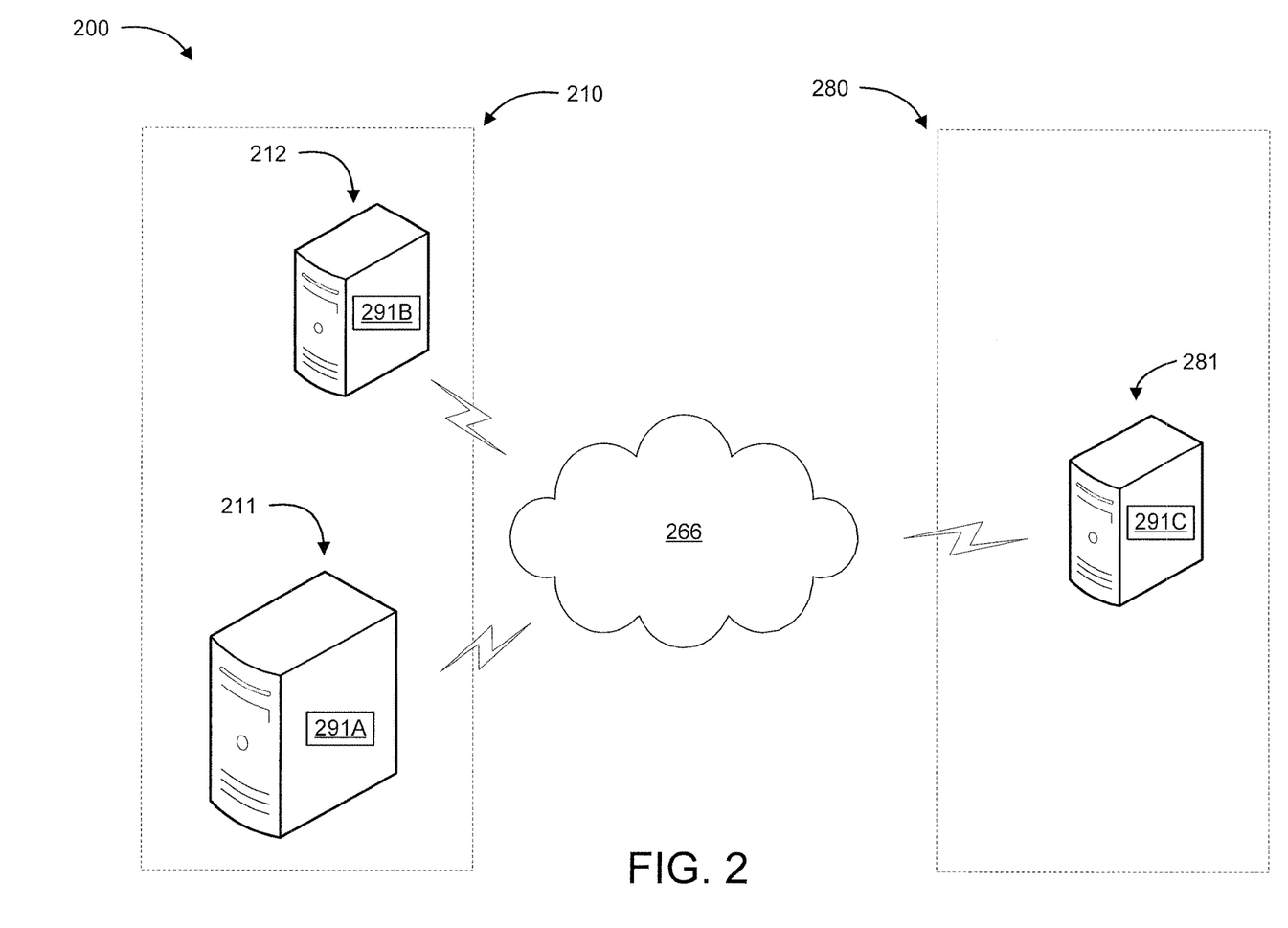
FIG. 2 shows an exemplary operating environment for determining an optimized time to retrain an analytic model, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
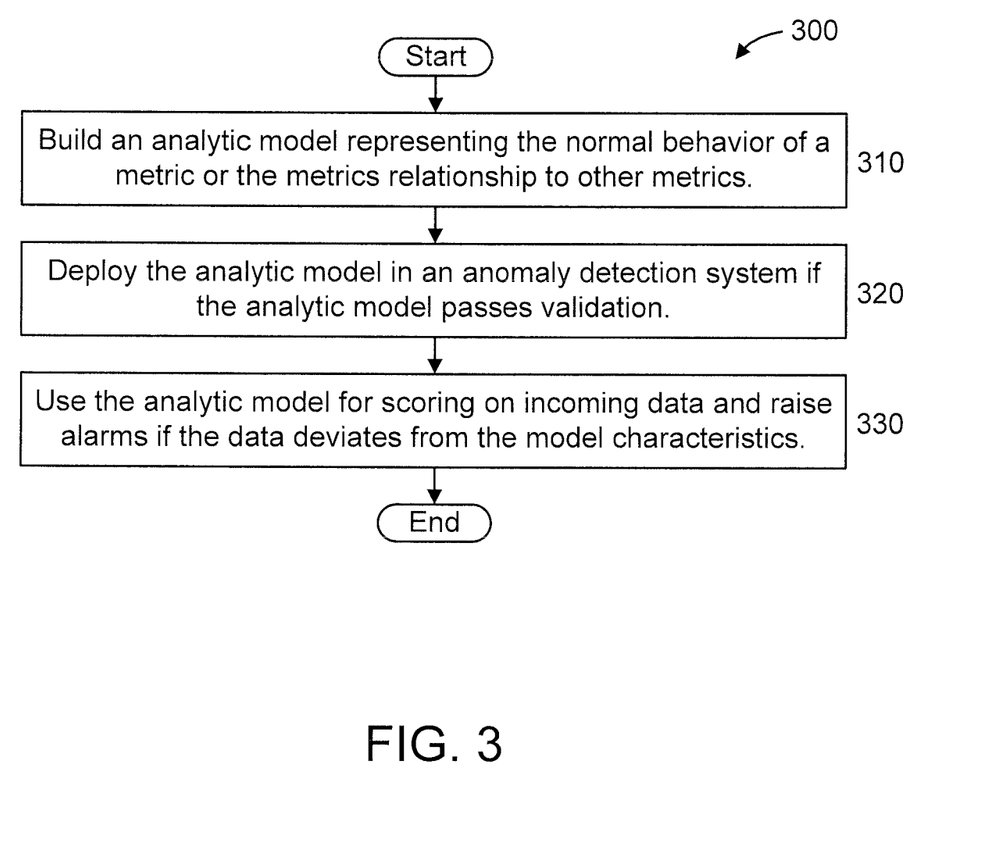
FIG. 3 shows an exemplary method for utilizing an analytic model, in accordance with an embodiment of the present principles.
Figure 4:
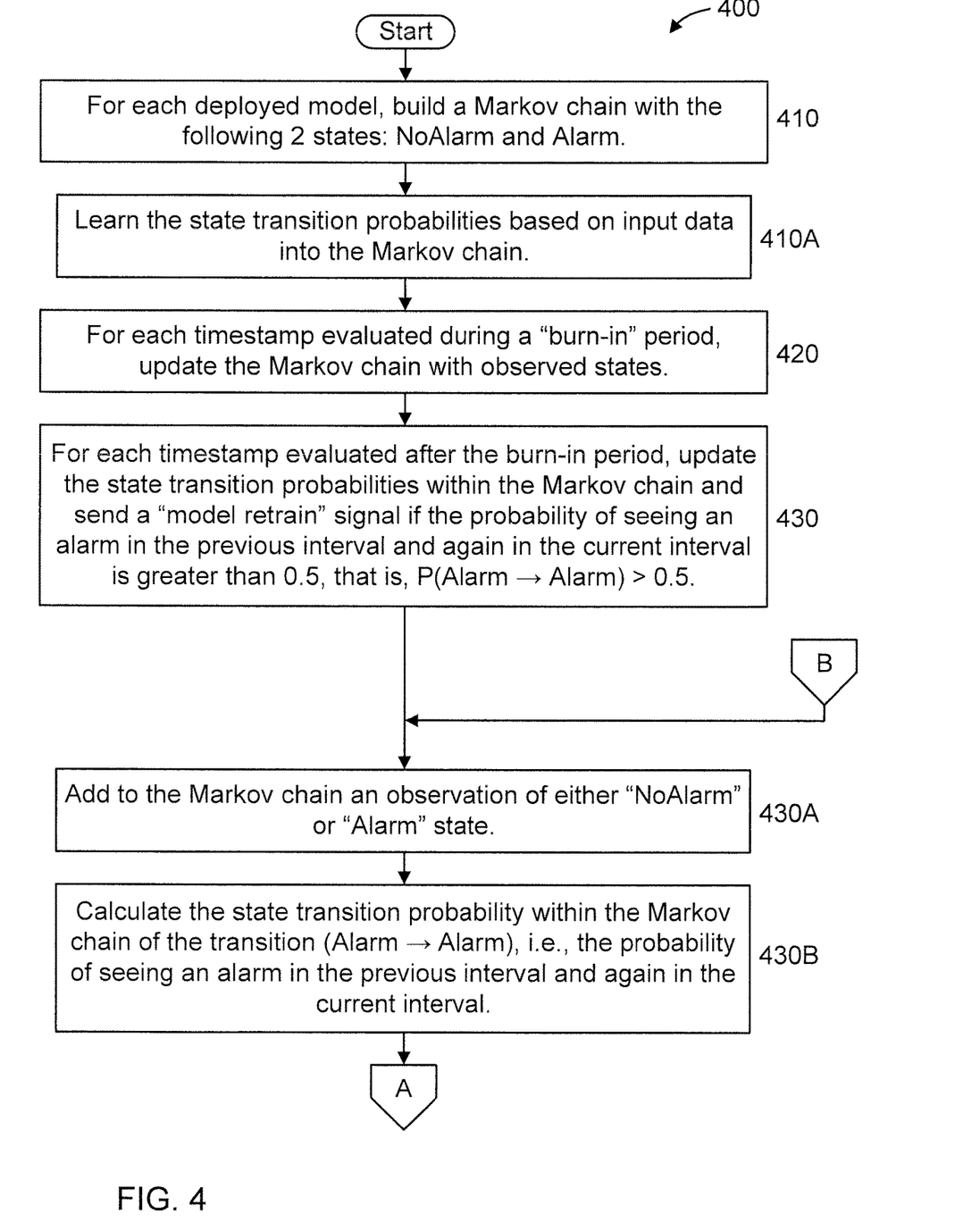
FIGS. 4-5 show an exemplary method for determining an optimized time to retrain an analytic model, in accordance with an embodiment of the present principles.
Figure 5:
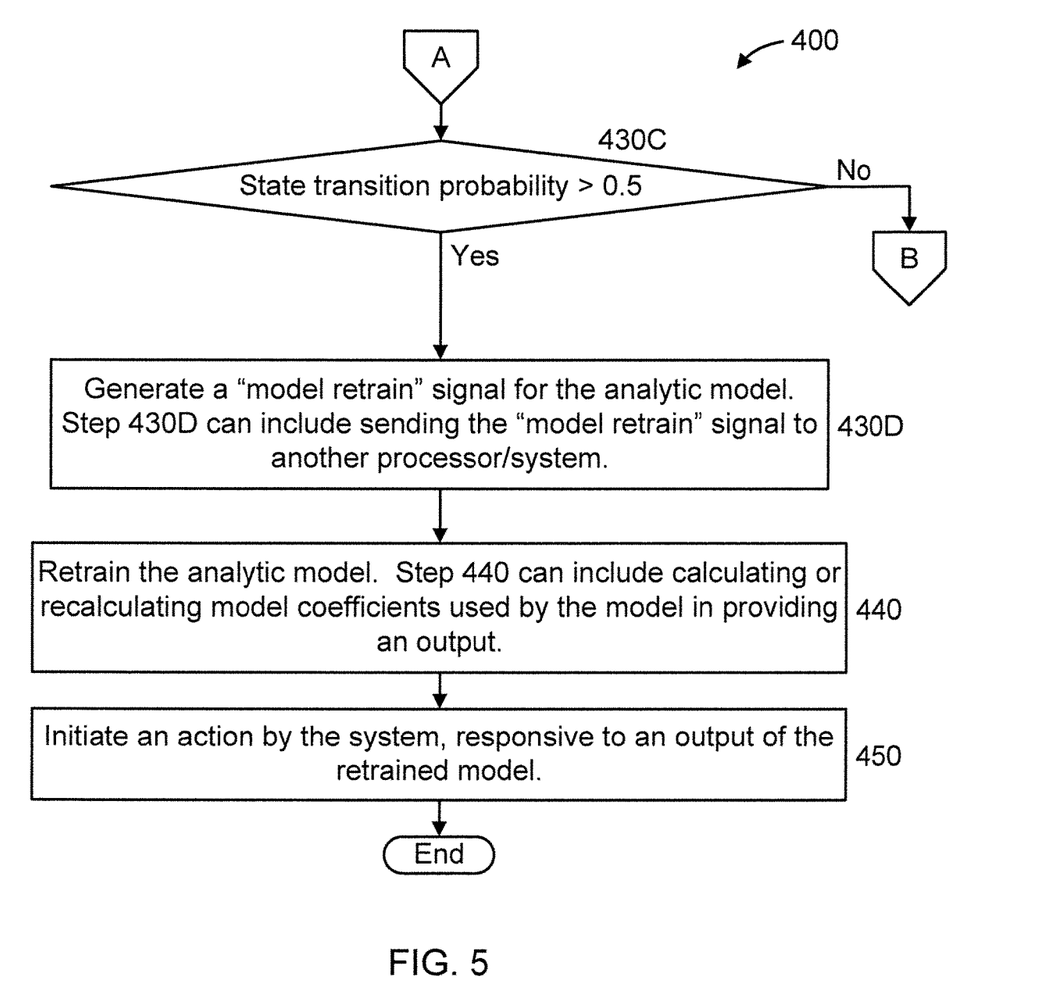

Further, it is to be appreciated that processing system 100 may perform at least part of the method described herein including, for example, at least part of method 300 of FIG. 3 and/or at least part of method 400 of FIGS. 4-5. Similarly, part or all of system 200 may be used to perform at least part of method 300 of FIG. 3 and/or at least part of method 400 of FIGS. 4-5.

FIG. 2 shows an exemplary operating environment 200 in which the present principles can be employed, in accordance with an embodiment of the present principles.

The operating environment 200 includes a computing device or server (hereinafter "server") 211. The server 211 is configured to determine an optimized time to retrain one or more analytic models (collectively denoted by the figure reference numeral 291, and also separately denoted by the figure reference numerals 291A, 291B, and 291C).

The models 291 can be used by the server 211 and/or by a system 210 in which the server 211 is included and/or by another system 280 (in which the server is not included). In the two latter cases, the optimized time is conveyed from the server 211 to another computing device or server (hereinafter "server") 212 in system 210 or to a computing device or server (hereinafter "server") 281 in the other system 280. For the sake of illustration, FIG. 2 illustrates all of the preceding scenarios. Of course, the present principles are not limited to the preceding scenarios and environment configuration and, thus, can be readily applied to other scenarios and environment configurations as readily appreciated by one of ordinary skill in the art given the teachings of the present principles provided herein, while maintaining the spirit of the present principles. Moreover, for the sake of illustration and brevity, systems 210 and 280 are shown with only the elements mentioned herein, but of course can include other elements as readily appreciated by one of ordinary skill in the art. Such other elements would depend upon the implementation and the types of systems involved, as readily appreciated by one of ordinary skill in the art.

For the sake of illustration, each of the servers 211, 212, and 281 will include a one of the models 291. In particular, server 211 will include model 291A, server 212 will include model 291B, and server 281 will include model 291C.

Each of the servers 211, 212, and 281 at least includes a respective processor, a respective memory, and respective structural devices for enabling communication (network adapters and so forth). As these elements are shown in FIG. 1, reiterating as noted above that elements in FIG. 1 can also be in the apparatus of FIG. 2, such elements are omitted from FIG. 2 for the sake of brevity and clarity.

Communication between the servers/systems can occur over one or more networks (collectively denoted by the figure reference numeral 266). The one or more networks 266 can include any type of networks such as, for example, but not limited to, cellular networks, local area networks, wide area networks, personal area networks, wireless networks, wired networks, any combination of the preceding, and so forth. In the embodiment of FIG. 2, the one or more networks 266 are implemented by one or more wireless networks for the sake of illustration.

The server 211 is configured to build, for each model, a Markov chain with the following 2 states: NoAlarm and Alarm. The server 211 is also configured to learn the state transition probabilities based on input data into the Markov chain.

The server 211 is further configured, for each timestamp evaluated during a "burn-in" period, to update the Markov chain with observed states.

The server 211 is also configured, for each timestamp evaluated after the burn-in period, to update the state transition probabilities within the Markov chain and send a "model retrain" signal if the probability of seeing an alarm in the previous interval and again in the current interval is greater than 0.5, that is, P(Alarm→Alarm)>0.5.

The server 211 and/or the server 282 can be configured, responsive to P(Alarm→Alarm)>0.5, to retrain the model.

The server 211 and/or the server 212 and/or the server 282 can be further configured to initiate an action by the system, responsive to an output of the retrained model. Exemplary actions are described herein below.

In the following embodiments relating to FIGS. 3-5, FIG. 3 represents a method 300 for forming and deploying an analytic model, and FIGS. 4-5 represent a method 400 for retraining the analytic model formed by method 300. As such, in an embodiment, method 300 can be considered a prerequisite or initial method performed prior to method 400.

FIG. 3 shows an exemplary method 300 for utilizing an analytic model, in accordance with an embodiment of the present principles. For the sake of illustration, a single analytic model is described with respect to method 300. However, each of the steps of method 300 can be readily performed and applied to more than one analytic model in order to form and deploy a set of models, as readily appreciated by one of ordinary skill in the art given the teachings of the present principles provided herein.

At step 310, build an analytic model representing the normal behavior of a metric or the metrics relationship to other metrics.

At step 320, deploy the analytic model in an anomaly detection system if the analytic model passes validation.

At step 330, use the analytic model for scoring on incoming data and raise alarms if the data deviates from the model characteristics.

FIGS. 4-5 show an exemplary method 400 for determining an optimized time to retrain an analytic model, in accordance with an embodiment of the present principles.

At step 410, for each deployed analytic model, build a Markov chain with the following 2 states: NoAlarm and Alarm.

In an embodiment, step 410 includes step 410A.

At step 410A, learn the state transition probabilities based on input data into the Markov chain. For example, step 410A can involve learning the respective probabilities of the model being in each of the two states, and the respective probabilities of each of possible transitions between the two states.

As an example relating to step 410A, the following state transition probabilities can be learned based on input data into the Markov chain:
(a) a probability of the model being in the alarm state;
(b) a probability of the model being in the no alarm state;
(c) a probability of the model being in the alarm state at time t and being in the alarm state again at time (t+1);
(d) a probability of the model being in the alarm state at time t and being in the no alarm state again at time (t+1);
(e) a probability of the model being in the no alarm state at the time t and being in the alarm state at time (t+1); and
(f) a probability of the model being in the no alarm state at the time t and being in the no alarm state at time (t+1).

Regarding the preceding probabilities, the term "+1" refers to the next time interval. Accordingly, the term "+1" does not necessarily refer to a particular time scale (e.g., milliseconds, seconds, minutes, etc.). As an example, if the system is designed to work at 5 minute intervals, then if time t is 12:00, then time (t+1) refers to 12:05.

At step 420, for each timestamp evaluated during a "burn-in" period, update the Markov chain with observed states. The burn-in period can be set for any time period, depending upon the implementation.

As an example relating to step 420, during a "burn-in" period of three hours in the case of data coming from IT Operations, if there is no alarm raised on the data evaluated using the deployed analytic model, then the Markov chain is updated with an observation of "NoAlarm", and "Alarm" otherwise. In an embodiment, this addition is carried out at every evaluated timestamp during the "burn-in" period.

At step 430, for each timestamp evaluated after the burn-in period, update the state transition probabilities within the Markov chain and send a "model retrain" signal if the probability of seeing an alarm in the previous interval and again in the current interval is greater than 0.5, that is, P(Alarm→Alarm)>0.5. Thus, step 430 involves re-learning the respective probabilities of each of possible transitions between the two states.

In an embodiment, step 430 includes steps 430A-430D, each of which being performed for every timestamp evaluated after the burn-in period.

At step 430A, add to the Markov chain an observation of either "NoAlarm" or "Alarm" state.

At step 430B, calculate the state transition probability within the Markov chain of the transition (Alarm→Alarm), i.e., the probability of seeing an alarm in the previous interval and again in the current interval. In an embodiment, step 430B is performed simultaneously with step 430A (either entirely simultaneously or with some overlap).

At step 430C, determine if the state transition probability calculated at step 430B is greater than 0.5. If so, then proceed to step 430D. Otherwise, return to step 430A to evaluate the next timestamp.

At step 430D, generate a "model retrain" signal for the analytic model. Step 430D can include sending the "model retrain" signal to another processor/system.

At step 440, retrain the analytic model. In an embodiment, step 440 can include calculating or recalculating model coefficients used by the model in providing an output (e.g., an indication, a prediction, and so forth).

At step 450, initiate an action by the system, responsive to an output of the retrained model. The action can include, but is not limited to, for example: shutting down one or more pieces of equipment relating to the alarm state; initiating corrective behavior to one or more pieces of equipment relating to the alarm state; modifying an operating time of one or more pieces of equipment relating to the alarm state;

and so forth. Of course, the preceding actions are illustrative, as they depend on the type of system to which the present principles are applied and/or otherwise used.

A description will now be given regarding some of the many attendant advantages of the present principles.

One advantage of the present principles is that they provide a lightweight, easily implementable approach with a minimal memory footprint, which is suitable for anomaly detection systems which work with data at scale in domains such as, but not limited to, the IT Operations domain.

Another advantage of the present principles is that they do not require any labeled data, i.e., there is no need to get user feedback on whether alarms are true positives. This independence from labeled data enables the approach to be used in an online fashion rather than post-hoc analysis only.

Still another advantage of the present principles is the logic that the present principles can use are based on simple-to-calculate yet meaningful statistics. That is, by treating alarms/anomalies as rare events, if the chance of seeing an alarm previously and now again is more than random (hence, the 0.5 threshold), then we treat the model as being stale/invalid. With a Markov chain, it accommodates for a case where the alarm rate is allowed to grow for a period of time as we detect problems. The key is that when the model gets continually poorer, i.e., it keeps raising alarms because the current behavior is significantly different from what is captured by the model, the Markov chain reflects that by the state transition of (Alarm→Alarm).

Yet another advantage is that the present principles provide a way to determine when a model used for anomaly detection has reached the point where it is no longer accurate and thus not suitable for anomaly detection, and should be updated to provide accurate results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
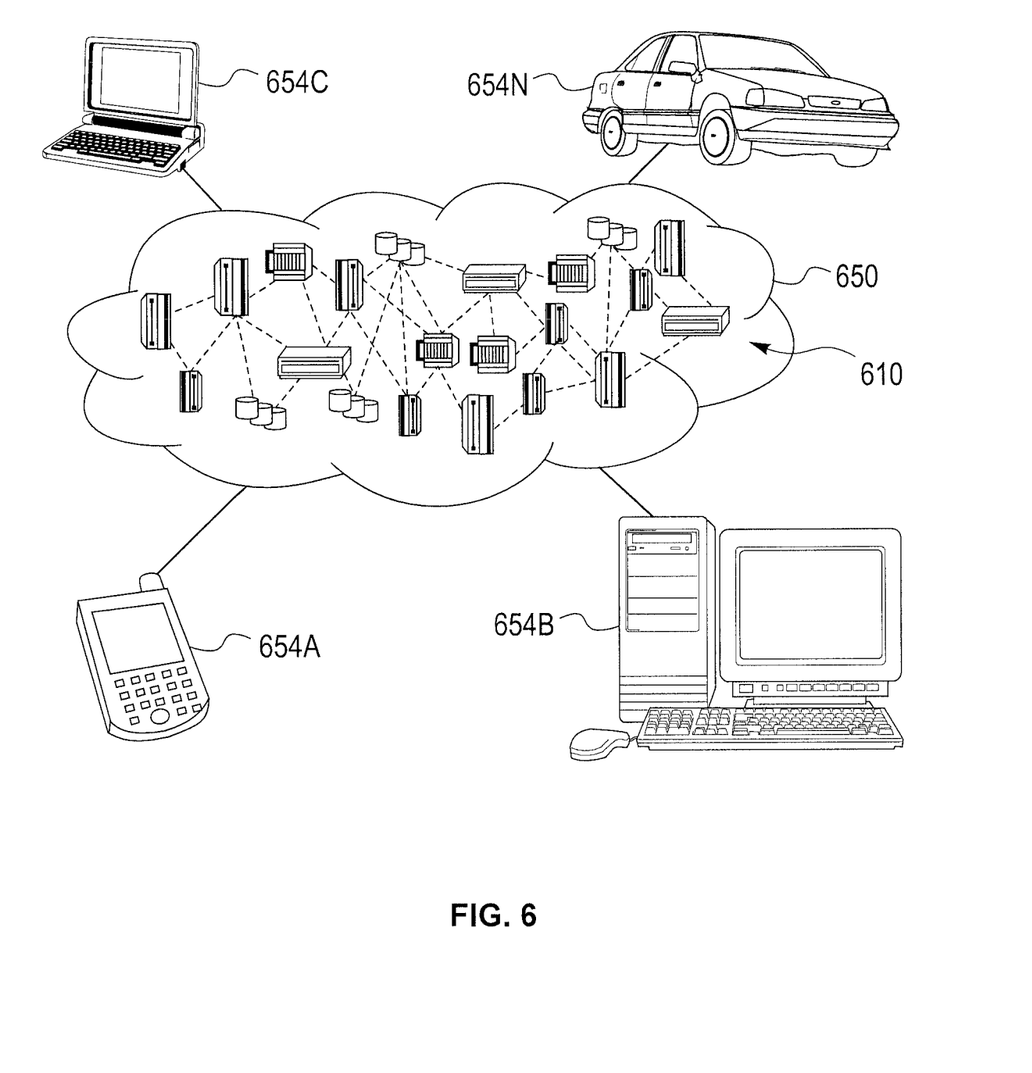
FIG. 6 shows an exemplary cloud computing environment, in accordance with an embodiment of the present principles.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
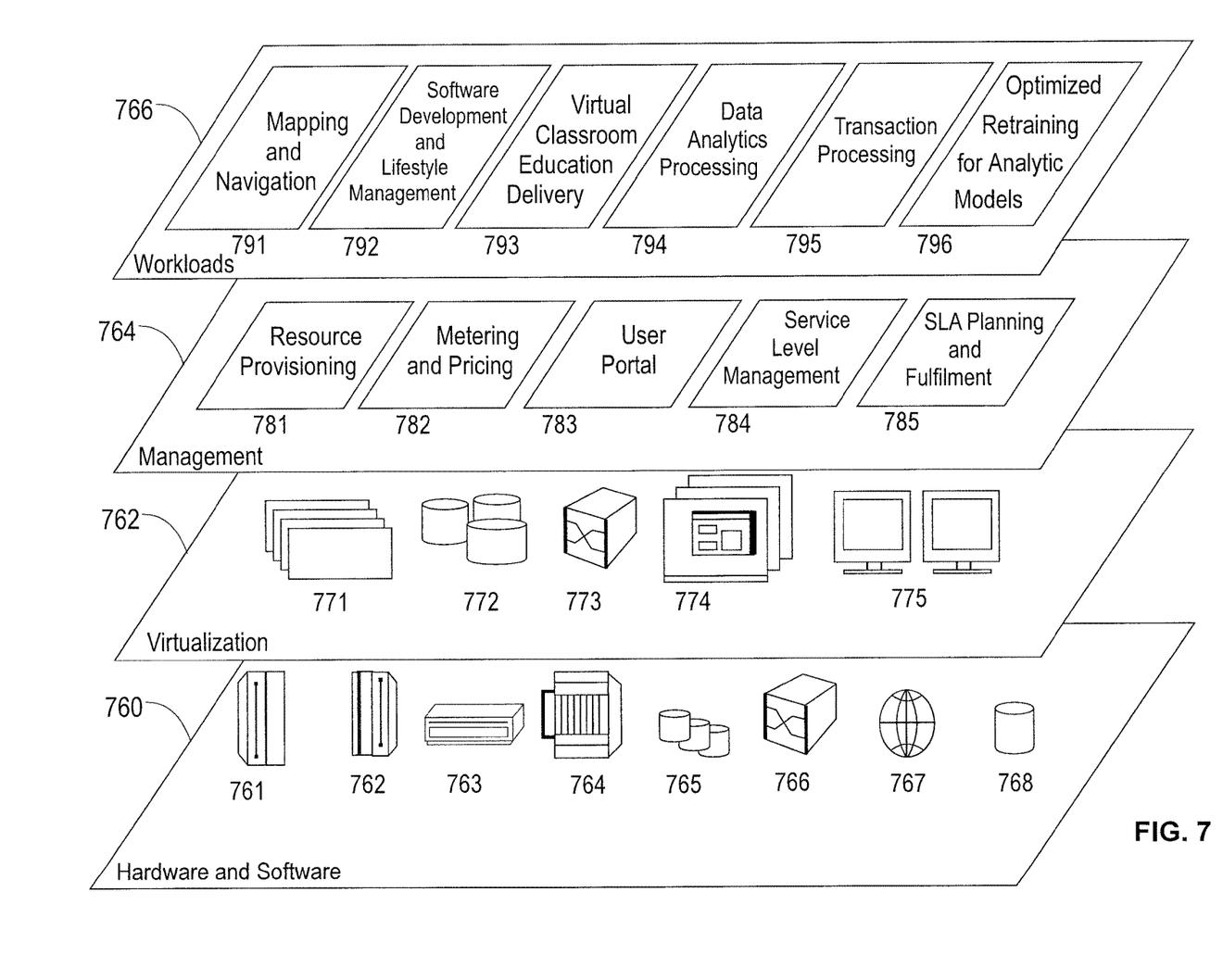
FIG. 7 shows an exemplary set of functional abstraction layers provided by the cloud computing environment shown in FIG. 6, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and optimized retraining for analytic models 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for retraining an analytic model, comprising:
building, by a processor, a Markov chain for the analytic model, wherein the Markov chain has only two states that consist of an alarm state and a no alarm state;
updating, by the processor, the Markov chain with observed states, for each of a plurality of timestamps evaluated during a burn-in period;
updating, by the processor, state transition probabilities within the Markov chain, for each of a plurality of timestamps evaluated after the burn-in period;
generating, by the processor, a signal for causing the model to be retrained, responsive to any of the state transition probabilities representing a probability in a range of greater than 0.5 up to 1.0 of seeing the alarm state in a previous interval and again in a current interval; and
retraining, by the processor or another processor, the model responsive to the signal for causing the model to be retrained.

2. The method of claim 1, wherein said building step comprises learning the respective probabilities of the model being in each of the two states, and the respective probabilities of each of possible transitions between the two states.

3. The method of claim 1, wherein said step of updating the Markov chain comprises:
adding an observation of the no alarm state to the Markov chain responsive to an absence of a raised alarm for data corresponding to a given one of the plurality of timestamps evaluated during the burn-in period; and
adding an observation of the alarm state to the Markov chain responsive to a presence of the raised alarm for the data corresponding to the given one of the plurality of timestamps evaluated during the burn-in period.

4. The method of claim 1, wherein said step of updating the state transition probabilities within the Markov chain comprises re-learning respective probabilities of each of possible transitions between the two states.

5. The method of claim 1, wherein said step of updating the state transition probabilities within the Markov chain comprises, for each of the plurality of timestamps evaluated after the burn-in period: calculating the probability of seeing the alarm state in the previous interval and again in the current interval.

6. The method of claim 1, wherein the method is performed in or for an anomaly detection and alerting system.

7. The method of claim 1, sending, by the processor to another processor, the signal for causing the model to be retrained, wherein the other processor is implemented using a cloud configuration.

8. The method of claim 1, wherein the analytic model represents normal behavior of a metric or one or more relationships between the metric and one or more other metrics.

9. A computer program product for retraining an analytic model, the computer program product comprising a computer readable storage medium having program instructions embodied therewith, the program instructions executable by a computer to cause the computer to perform a method comprising:
   building, by a processor, a Markov chain for the analytic model, wherein the Markov chain has only two states that consist of an alarm state and a no alarm state;
   updating, by the processor, the Markov chain with observed states, for each of a plurality of timestamps evaluated during a burn-in period;
   updating, by the processor, state transition probabilities within the Markov chain, for each of a plurality of timestamps evaluated after the burn-in period;
   generating, by the processor, a signal for causing the model to be retrained, responsive to any of the state transition probabilities representing a probability in a range of greater than 0.5 up to 1.0 of seeing the alarm state in a previous interval and again in a current interval; and
   retraining, by the processor or another processor, the model responsive to the signal for causing the model to be retrained.

10. The computer program product of claim 9, wherein said building step comprises learning the respective probabilities of the model being in each of the two states, and the respective probabilities of each of possible transitions between the two states.

11. The computer program product of claim 9, wherein said step of updating the Markov chain comprises:
   adding an observation of the no alarm state to the Markov chain responsive to an absence of a raised alarm for data corresponding to a given one of the plurality of timestamps evaluated during the burn-in period; and
   adding an observation of the alarm state to the Markov chain responsive to a presence of the raised alarm for the data corresponding to the given one of the plurality of timestamps evaluated during the burn-in period.

12. The computer program product of claim 9, wherein said step of updating the state transition probabilities within the Markov chain comprises re-learning respective probabilities of each of possible transitions between the two states.

13. The computer program product of claim 9, wherein said step of updating the state transition probabilities within the Markov chain comprises, for each of the plurality of timestamps evaluated after the burn-in period: calculating the probability of seeing the alarm state in the previous interval and again in the current interval.

14. The computer program product of claim 9, wherein the method is performed in or for an anomaly detection and alerting system.

15. The computer program product of claim 9, sending, by the processor to another processor, the signal for causing the model to be retrained, wherein the other processor is implemented using a cloud configuration.

16. A system for retraining an analytic model, comprising: a processor and a memory, configured to:
   build a Markov chain for the analytic model, wherein the Markov chain has only two states that consist of an alarm state and a no alarm state;
   update the Markov chain with observed states, for each of a plurality of timestamps evaluated during a burn-in period;
   update state transition probabilities within the Markov chain, for each of a plurality of timestamps evaluated after the burn-in period;
   generate a signal for causing the model to be retrained, responsive to any of the state transition probabilities representing a probability in a range of greater than 0.5 up to 1.0 of seeing the alarm state in a previous interval and again in a current interval; and
   retraining the model responsive to the signal for causing the model to be retrained.

17. The system of claim 16, wherein the processor and the memory are further configured to, responsive to the signal for causing the model to be retrained:
   retrain the model; and
   initiate an action by the system based on an output of the retrained model.

18. The system of claim 17, wherein the action by the system includes shutting down one or more pieces of equipment relating to the alarm state.

* * * * *